(12) United States Patent
Pauli et al.

(10) Patent No.: US 12,190,569 B2
(45) Date of Patent: Jan. 7, 2025

(54) ADAPTIVE ARTIFICIAL INTELLIGENCE FOR THREE-DIMENSIONAL OBJECT DETECTION USING SYNTHETIC TRAINING DATA

(71) Applicant: Microsoft Technology Licensing, LLC, Redmond, WA (US)

(72) Inventors: Wolfgang Martin Pauli, Seattle, WA (US); Mario Emil Inchiosa, San Francisco, CA (US); Lingzhi Allen, Kirkland, WA (US); Daniel James Haines, Emmbrook (GB); Matthew Anthony William Hyde, Brighton (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 420 days.

(21) Appl. No.: 17/738,754

(22) Filed: May 6, 2022

(65) Prior Publication Data

US 2023/0154166 A1    May 18, 2023

Related U.S. Application Data

(60) Provisional application No. 63/278,774, filed on Nov. 12, 2021.

(51) Int. Cl.
*G06T 7/11* (2017.01)
*G06V 10/26* (2022.01)
(Continued)

(52) U.S. Cl.
CPC .......... *G06V 10/7747* (2022.01); *G06V 10/26* (2022.01); *G06V 10/764* (2022.01);
(Continued)

(58) Field of Classification Search
CPC .......... G06K 9/00261; G06K 9/00288; G06K 9/00228; G06K 9/00268; G06K 9/00281;
(Continued)

(56) References Cited

U.S. PATENT DOCUMENTS

| 2017/0277978 A1 | 9/2017 | Song et al. |
| 2018/0121762 A1* | 5/2018 | Han .................. G06F 18/2413 |

(Continued)

FOREIGN PATENT DOCUMENTS

| WO | 2010050952 A1 | 5/2010 |
| WO | WO-2019210124 A1 * | 10/2019 ............. A61B 3/102 |

OTHER PUBLICATIONS

"Azure AI and Machine Learning | Using Azure Stack Edge to help stop animal trafficking", Retrieved from: https://www.youtube.com/watch?v=U3ozr16BS5A, Jul. 15, 2020, 3 Pages.

(Continued)

*Primary Examiner* — Quan M Hua
(74) *Attorney, Agent, or Firm* — Weaver IP L.L.C.

(57) ABSTRACT

Embodiments described herein are directed to an adaptive AI model for 3D object detection using synthetic training data. For example, an ML model is trained to detect certain items of interest based on a training set that is synthetically generated in real time during the training process. The training set comprises a plurality of images depicting containers that are virtually packed with items of interest. Each image of the training set is a composite of an image comprising a container that is packed with items of non-interest and an image comprising an item of interest scanned in isolation. A plurality of such images is generated during any given training iteration of the ML model. Once trained, the ML model is configured to detect items of interest in actual containers and output a classification indicative of a likelihood that a container comprises an item of interest.

20 Claims, 9 Drawing Sheets

(51) Int. Cl.
*G06V 10/764* (2022.01)
*G06V 10/774* (2022.01)
*G06V 10/776* (2022.01)
*G06V 10/82* (2022.01)
*G06V 20/64* (2022.01)
*G08B 21/02* (2006.01)

(52) U.S. Cl.
CPC .......... *G06V 10/776* (2022.01); *G06V 10/82* (2022.01); *G06V 20/64* (2022.01); *G08B 21/02* (2013.01)

(58) Field of Classification Search
CPC ......... G06K 9/6202; G06K 2009/4666; G06K 9/00362; G06K 9/4642; G06K 9/6206; G06K 9/6255; G06K 9/6256; G06K 9/00275; G06K 9/00308; G06K 9/00926; G06K 9/3233; G06K 9/4671; G06K 9/6215; G06K 9/6228; G06K 9/6262; G06K 9/627; G06K 9/6276; G06K 9/629; G06N 3/0454; G06N 3/084; G06N 3/08; G06T 11/00; G06T 2207/10016; G06T 2207/10024; G06T 2207/20081; G06T 2207/30201; G06T 2207/30241; G06T 2207/30244; G06T 7/251; G06T 7/74; G06T 7/08

See application file for complete search history.

(56) References Cited

U.S. PATENT DOCUMENTS

2020/0057917 A1* 2/2020 Deng .................. G06N 3/08
2020/0394430 A1 12/2020 Ahmed et al.

OTHER PUBLICATIONS

"International Search Report and Written Opinion Issued in PCT Application No. PCT/US22/040689", Mailed Date: Nov. 28, 2022, 10 Pages.

* cited by examiner

ADAPTIVE ARTIFICIAL INTELLIGENCE FOR THREE-DIMENSIONAL OBJECT DETECTION USING SYNTHETIC TRAINING DATA

CROSS-REFERENCE TO RELATED APPLICATION(S)

This application claims priority to U.S. Provisional Patent Application No. 63/278,774 entitled "ADAPTIVE ARTIFICIAL INTELLIGENCE FOR THREE-DIMENSIONAL OBJECT DETECTION USING SYNTHETIC TRAINING DATA," and filed on Nov. 12, 2021, the entirety of which is incorporated by reference herein.

BACKGROUND

Security checkpoints (e.g., airports, court houses, etc.) are typically equipped with X-ray scanners that enable officers to check the luggage of civilians for prohibited items (e.g., explosives, liquids, guns, sharps, parts of protected species). Due to the need for heavy human involvement, screening processes are slow, expensive, and inaccurate. The main challenge for developing an artificial intelligence (AI)-based solution is the need for very large hand-labeled datasets. Vendors and government organizations in this industry have spent months and years to curate such training sets for a small subset of items of interest. This requirement to curate large datasets for training AI models is a major drag on algorithm development, making it impossible to rapidly respond to emerging threats (e.g., 3D-printed weapons).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are directed to an adaptive AI model for three-dimensional (3D) object detection using synthetic training data. In accordance with the embodiments described herein, a machine learning model is trained to detect certain items of interest based on a training set that is synthetically generated in real time during the training process. The training set comprises a plurality of images depicting containers (e.g., luggage, bags, handbags, etc.) that are virtually packed with items of interest. Each image of the training set is a composite of an image comprising a container that is packed with items of non-interest and an image comprising an item of interest scanned in isolation. To generate a composite image, the image comprising the item of interest may be modified or transformed (e.g., scaled, rotated, etc.) and then virtually placed in a random location in the container depicted in the image. A plurality of such images is generated during any given training iteration of the machine learning model. Once trained, the machine learning model is configured to detect items of interest in actual containers and output a classification indicative of a likelihood that a container comprises an item of interest.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
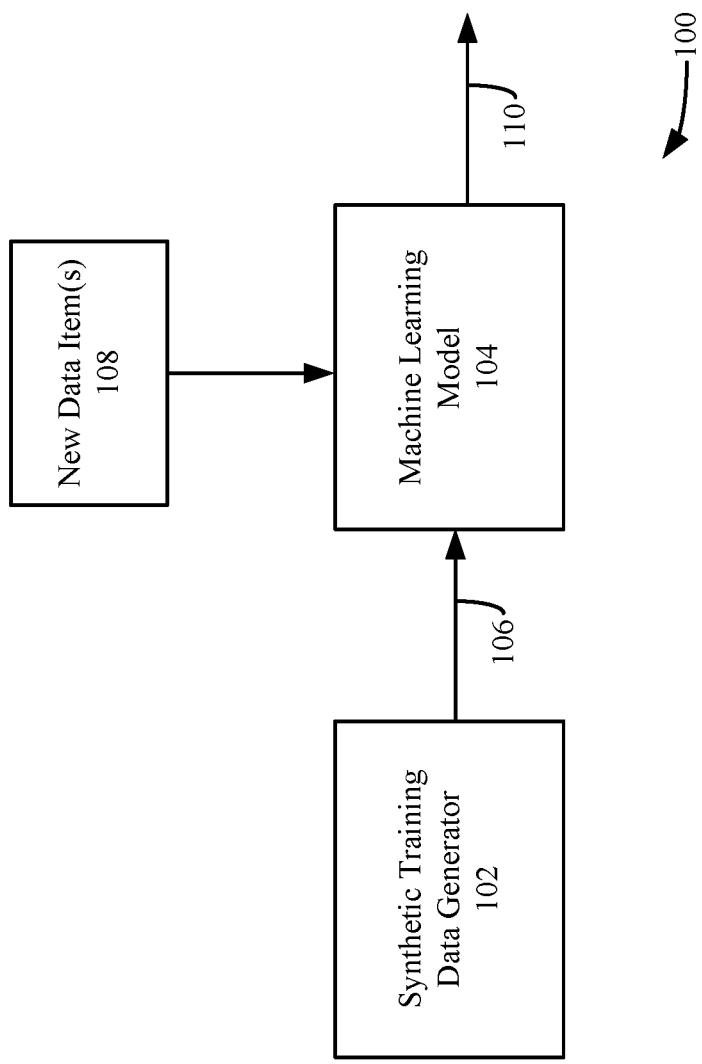
FIG. 1 shows a block diagram of an example system for generating an adaptive artificial intelligence (AI) model for three-dimensional (3D) object detection in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, terms such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein are directed to an adaptive AI model for three-dimensional (3D) object detection using synthetic training data. In accordance with the embodiments described herein, a machine learning model is trained to detect certain items of interest based on a training set that is synthetically generated in real time during the training process. The training set comprises a plurality of images depicting containers (e.g., luggage, bags, handbags, etc.) that are virtually packed with items of interest. Each image of the training set is a composite of an image comprising a container that is packed with items of non-interest and an image comprising an item of interest scanned in isolation. To generate a composite image, the image comprising the item of interest may be modified or transformed (e.g., scaled, rotated, etc.) and then virtually placed in a random location in the container depicted in the image. A plurality of such images is generated during any given training iteration of the machine learning model. Once trained, the machine learning model is configured to detect items of interest in actual containers and output a classification indicative of a likelihood that a container comprises an item of interest.

The techniques described herein advantageously improve the technological field of image-based screening by enabling the curation of large training datasets obsolete, reducing the response time to emerging threats from several months, or even years, to just a few days, and only requiring a handful of source images to generate the training set of virtually-packed images. This provides a massive savings in cost in terms of development and time. The techniques described herein may be utilized to recognize any number of items of interest in many different contexts.

As described herein, certain techniques are utilized to minimize the amount of compute resources required to synthesize training data. For instance, after a composite image is generated, the composite image may be cropped, and a predetermined number of voxels from the cropped image may be sampled. The points that are sampled are spaced apart, thereby reducing the likelihood that a voxel comprising an edge of the item of interest is sampled. Not only does this speed up processing (as every single voxel is not being sampled), but it also conserves compute resources (e.g., processing cycles, memory, storage, etc.). In addition, it also improves the accuracy of the machine learning model because utilizing such samples reduce the chances of the machine learning model simply learning to identify the boundaries of pasted objects (which may result in an inaccurate classification).

Past attempts at improving screening processes only use a 2.5 dimensional approach. The bag is rendered in 3D, and rotated in front of a simulated camera lens, to create two-dimensional (2D) images of the bag from different angles. This 2.5D approach is flawed, because it allows perpetrators to hide objects in a cluttered bag.

FIG. 1 shows a block diagram of an example system 100 for generating an adaptive artificial intelligence (AI) model for three-dimensional (3D) object detection in accordance with an example embodiment. As shown in FIG. 1, system 100 includes a synthetic training data generator 102 and a machine learning model 104. Synthetic training data generator 102 is configured to dynamically generate a plurality of 3D images that are utilized to train machine learning model 104. Each of the plurality of 3D images are generated based on a composite of different images. Machine learning model 104 is configured to detect a particular entity or item (also referred herein as an "item of interest") in a particular container depicted in a 3D image. Examples of items of interest include, but are not limited to, animals, bones, weapons, fruits, vegetables, etc. Examples of containers include, but are not limited to, various types of luggage, boxes, bottles, jars, bags, handbags etc.

Synthetic training data generator 102 may be configured to generate an artificial (or synthetic) 3D image that depicts the item of interest being included in a container. For instance, synthetic training data generator 102 may be configured to obtain a first 3D image of the item of interest and obtain a second 3D image of a container that does not include the item of interest. Synthetic training data generator 102 then generates a new 3D image in which the item of interest from the first 3D image is virtually added to the container of the second 3D image. The item of interest may be randomly placed in a location within the container. In addition, a transformation may be performed on the item of interest before positioning it in a particular location in the container. Examples of transformations include, but are not limited to, scaling the item of interest to a different size, rotating the item of interest by a certain number of degrees, flipping (or reflecting) the item of interest, etc. Using such techniques, synthetic training data generator 102 may generate any number of synthetic 3D images, where in each synthetic 3D image, the item of interest is placed at a different location within the container and/or is transformed in a different manner. Synthetic training data generator 102 generates a training data set 106 based on the generated synthetic 3D images and provides training data set 106 to machine learning model 104. The training data set 106 comprises the generated synthetic 3D image, which may be represented via one or more feature vectors, each comprising a plurality of features (such as, but not limited to, edges, curves, colors, shapes, etc.)

Machine learning model 104 may be an artificial neural network (ANN) that is configured to learn to classify various items of interest included in different types of containers utilizing training data set 106. In accordance with an embodiment, machine learning model 104 is an autoencoder-based ANN. An autoencoder-based ANN is configured to learn data encodings representative of training data set 106 in a semi-supervised manner. The aim of an autoencoder-based ANN is to learn a lower-dimensional representation (e.g., a semantic representation) for higher-dimensional data (i.e., training data set 106), typically for dimensionality reduction, by training the ANN to capture the most important or relevant parts of the 3D images represented by training data set 106.

Figure 2:
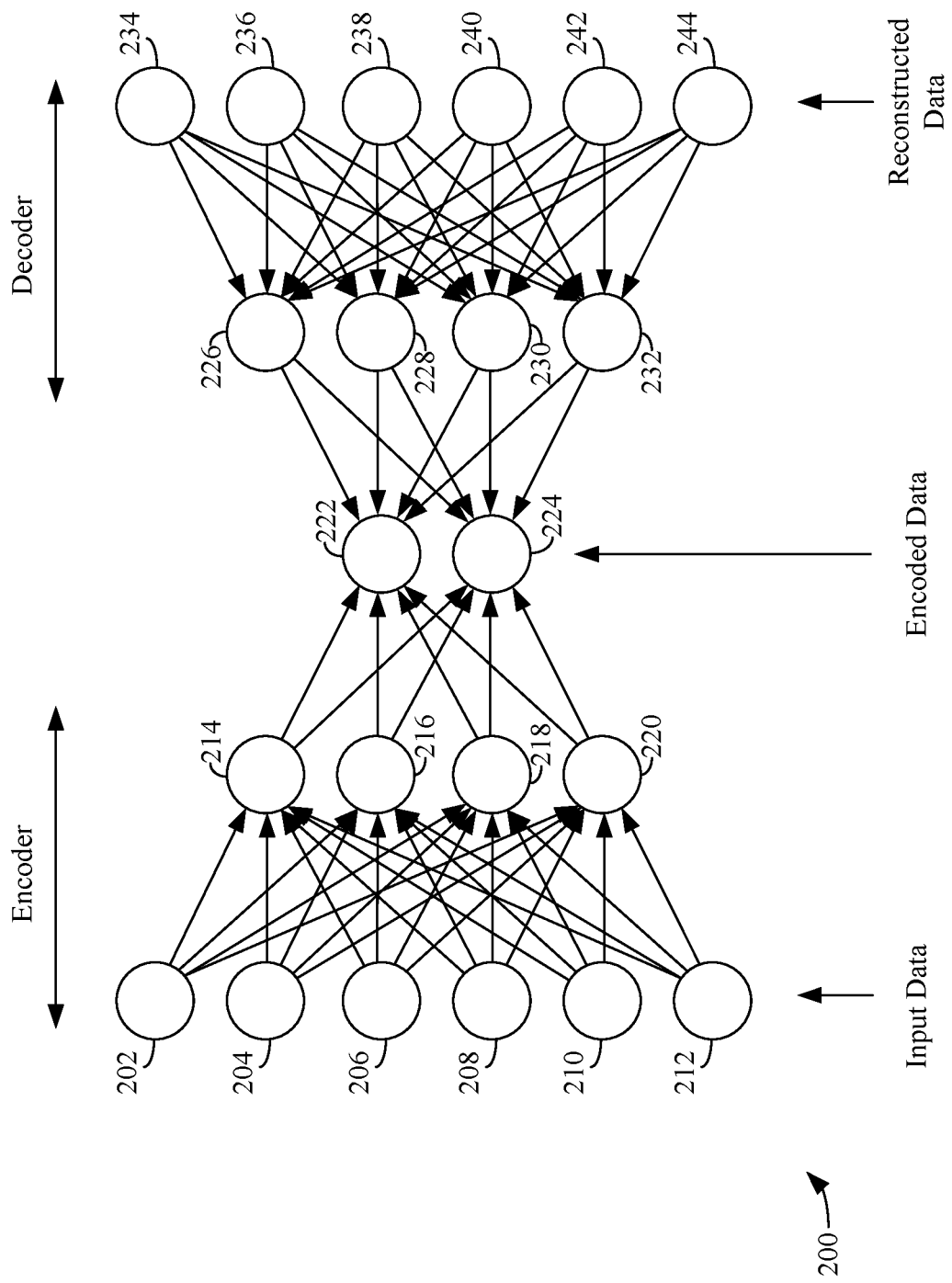
FIG. 2 depicts a diagram of an autoencoder in accordance with an example embodiment.

For example, FIG. 2 depicts a diagram of an autoencoder 200 in accordance with an example embodiment. Autoencoder 200 is an example of autoencoder utilized for machine learning model 104. Autoencoder 200 is configured to learn data encodings representative of the features of the synthetic 3D images of training data set 106, for example, in a semi-supervised manner. The aim of autoencoder 200 is to learn a lower-dimensional representation (e.g., a semantic representation) for higher-dimensional data (i.e., training data set 106). As shown in FIG. 2, autoencoder comprises a plurality of nodes 202-244. Nodes 202, 204, 206, 208, 210, and 212 may represent an input layer by which features vector(s) based on training data set 106 are received by autoencoder 200.

Autoencoder 200 generally comprises three parts: an encoder, a bottleneck, and a decoder, each of which comprising one or more nodes. The encoder may be represented by nodes 202-220. The encoder (or encoder network) encodes the input data (i.e., input feature vector(s) 108) into increasingly lower dimensions. That is, the encoder is configured to compress the input data (i.e., input feature vector(s) 108) into an encoded representation that is typically several orders of magnitude smaller than the input data. The encoder may perform a set of convolutional and pooling operations that compress the input data into the bottleneck. The bottleneck (represented by nodes 222 and 224) is configured to restrict the flow of data to the decoder from the encoder to force a compressed knowledge representation of input feature vector(s) 108. The decoder may be represented by nodes 226-244. The decoder (or decoder network) is configured to decode input feature vector(s) 108 into higher increasingly higher dimensions. That is, the decoder is configured to decompress the knowledge representations and reconstruct input feature vector(s) 108 back from their encoded form. The decoder may perform a series of upsampling and transpose convolutional operations that reconstruct the compressed knowledge representations outputted from the bottleneck back into the form of the 3D images represented by training data set 106. Nodes 234-244 may represent an output layer by which the reconstructed data (representative of the feature vector(s) based on training data set 106) and is represented and/or provided.

Autoencoders, such as autoencoder 200 are utilized for deep learning techniques; in particular, autoencoders are a type of an artificial neural network. The loss function used to train an autoencoder (e.g., autoencoder 200) is also referred to the reconstruction loss or error, as it is a check of how well the feature vector(s) of training data set 106 are reconstructed. Each of nodes 202-244 are associated with a weight, which emphasizes the importance of a particular node (also referred to as a neuron). For instance, suppose a neural network is configured to classify whether a synthetic 3D image comprises an elephant tusk. In this case, nodes containing features of an elephant tusk would be weighed more than features that are atypical of an elephant tusk. The weights of a neural network are learned through training on a training data set 106. The neural network executes multiple times, changing its weights through backpropagation with respect to a loss function. In essence, the neural network tests data, makes predictions, and determines a score representative of its accuracy. Then, it uses this score to make itself slightly more accurate by updating the weights accordingly. Through this process, a neural network can learn to improve the accuracy of its predictions.

The reconstruction loss or error is typically the mean-squared-error (e.g., the distance between the feature vector(s) of training data set 106 and the reconstructed version thereof). Every layer of autoencoder 200 may have an affine transformation (e.g., Wx+b, where x corresponds to a column vector corresponding to a sample from the dataset (e.g., training data set 106) that is provided to autoencoder 200, W corresponds to the weight matrix, and b corresponds to a bias vector) followed by a non-linear function (for example, a rectified linear unit function (or ReLU function) that forces negative values to zero and maintains the value for non-negative values). In the forward pass, the predicted values are computed followed by the loss computation, with all the weights of nodes 202-244 initially set to random and updated iteratively. In the next step, the gradients are computed to alter the weights in a direction that reduces the loss. The process (also referred to stochastic gradient descent) is repeated till convergence.

Referring again to FIG. 1, after machine learning model 104 is trained to identify items of interest, new data items 108 (e.g., new 3D images) may be provided to machine learning model 104, and machine learning model 104 attempts to classify new a data item 108. For each item of interest detected for a particular new data item, machine learning model 104 may output a classification 110 comprising a probability (e.g., a value between 0 and 1) that indicates the likelihood that the new data item comprises a certain item of interest. For instance, machine learning model 104 may output a probability for a first item of interest (e.g., a gorilla skull) detected in a 3D image and may output a probability for a second item of interest (e.g., an ivory tusk) detected in the 3D image. In addition, machine learning model 104 may also output the location of the item in the luggage depicted in the 3D image.

Figure 3:
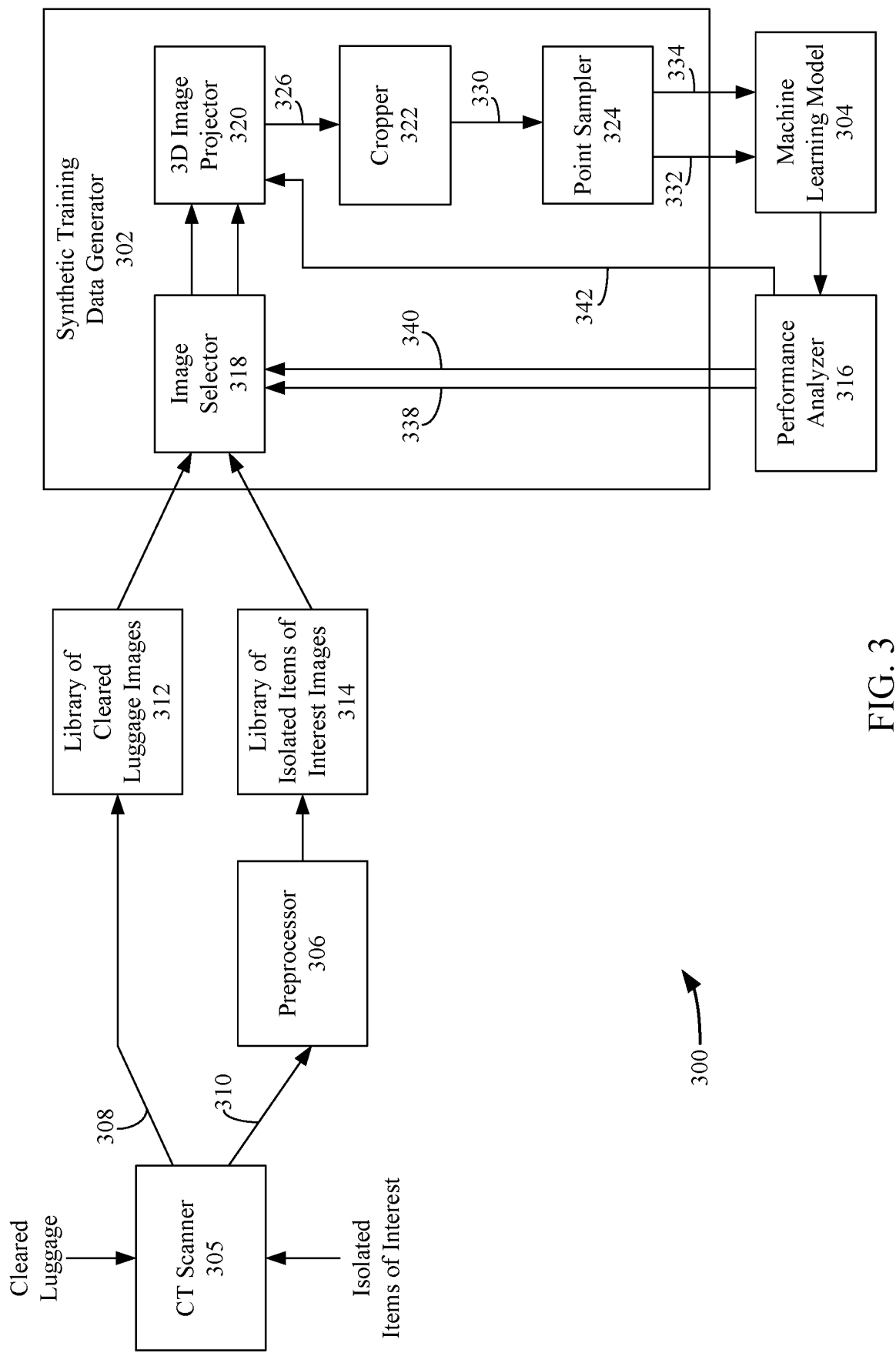
FIG. 3 is a block diagram of a system for generating synthetic training data in accordance with an example embodiment.

FIG. 3 is a block diagram of a system 300 for generating synthetic training data in accordance with an example embodiment. The following description is described with reference to an embodiment in which luggage is scanned for certain items of interest. However, it is noted that the techniques described herein may be utilized for other purposes.

As shown in FIG. 3, system 300 comprises a synthetic training data generator 302, a computed tomography (CT) scanner 305, a preprocessor 306, a machine learning model 304, and a performance analyzer 316. Synthetic training data generator 302 and machine learning model 304 are examples of training data generator 102 and machine learning model 104, as respectively described above with reference to FIG. 1. CT scanner 305 is configured to generate a CT scan of objects (e.g., containers) placed therewithin. CT scanner 305 may utilize a rotating X-ray tube and a row of detectors placed in a gantry thereof to measure X-ray attenuations. The beam of X-ray is attenuated when photons are absorbed when the X-ray beam passes through various items stored in the container. The multiple X-ray measurements taken from different angles are then processed using reconstruction algorithms to produce tomographic (cross-sectional) images of the container. CT scanner 305 may be any CT scanning machine that is known in the art. CT scanner 305 may provide, as an output, one or more image files comprising 3D image data. The image file(s) may be formatted in accordance with the DICOM (Digital Imaging and Communications in Medicine) format, the Visualization Toolkit (VTK) format, the Insight Segmentation and Registration Toolkit (ITK) MetaImage format (e.g., MHA files), etc.

CT scanner 305 may be utilized to perform CT scans of two types of entities: (1) luggage that has been determined to not include any items of interest (shown as "cleared luggage"), and (2) items of interest. The luggage may comprise a plurality of different containers (e.g., that were packed by passengers with various items) and were cleared as not including any items of interest (e.g., via a screening process, such as an airport screening process). Each item of interest provided to CT scanner 305 is scanned in isolation (i.e., without any other items in proximity thereto). Each item of interest may be placed in a box (e.g., a cardboard box with support material (such as foam) surrounding the item of interest. For each luggage scanned, CT scanner 305 outputs a 3D image file 308. For each isolated item of interest scanned, CT scanner 305 outputs a 3D image file 310. Because image files 308 and 310 are 3D image files, these files comprise voxels of data. A voxel is the 3D analog of a pixel. A voxel represents a value in three-dimensional space. Thus, each voxel of an image file may comprise the particle density at an X-coordinate, a Y-coordinate, and a Z-coordinate, which represent the location of the voxel within the image. The combined information of voxel coordinates and particular density values can be utilized to differentiate between different types of materials, including, but not limited to, paper, metal, cloth, bone, etc.

A plurality of cleared luggage may be scanned by CT scanner 305 to generate a library of cleared luggage images 312. Library 312 may be maintained in a data store, which be any type of storage device or array of devices. Similarly, a plurality of isolated items of interest may be scanned by CT scanner 305 to generate a library of items of interest images 314. Library 314 may be maintained in a data store, which be any type of storage device or array of devices. In accordance with an embodiment, before storing image files 310 in library 314, images 310 may be provided to a preprocessor 306. Preprocessor 306 is configured to remove noise from images 310. The noise may include the support material and/or the box. For instance, preprocessor 306 may perform any of Gaussian smoothing-based noise reduction techniques, thresholding-based noise reduction techniques, convex hull-based noise reduction techniques, etc. to remove various types of noise from images 310. The processed images are stored in library 314.

Synthetic training data generator 302 is configured to generate training data based on images stored in libraries 312 and 314 for training machine learning model 304. Synthetic training data generator 302 comprises an image selector 318, a 3D image projector 320, a cropper 322, and a point sampler 324. Image selector 318 is configured to select an image file from library 312 and an image file from library 314 and provides the pair of images to 3D image projector 220. For any given training iteration, image selector 318 may select a plurality of pair of images (where each pair comprises an image from each of library 312 and an image from library 314) to generate a batch training set. In accordance with an embodiment, image selector 318 may select 64 pairs of images.

Image selector 318 may select images from library 314 in a random fashion. Alternatively, image selector 318 may select images from library 314 in accordance with a curriculum learning-based technique. In accordance with such a technique, items of interest that machine learning model 304 is having difficulty recognizing will have a higher chance of being selected to speed up the training process, while at the same time adjusting parameters for packing these items into containers, to make the task slightly easier. Image selector 318 may utilize a weighting scheme, where images 310 comprising such items of interest are weighted more, thereby increasing the likelihood that such images are selected for training. For example, performance analyzer 316 may be configured to determine a classification performance score for each item of interest on which machine learning model 304 is trained. Each classification performance score is indicative of a level of performance of machine learning model 304 with respect to classifying a particular item of interest within a particular container. Each classification performance score may be based on the F-score (also referred to as the F1-score) of machine learning model 304, which is a measure of the accuracy of machine learning model 304 on a dataset (i.e., training data set 106). The F-score may be defined as the harmonic mean of the precision and recall of machine learning model 304. A relatively low classification performance score for a particular item of interest may mean that a classification generated by machine learning model 304 for that item of interest is relatively inaccurate and that machine learning model 304 is having difficulty recognizing a particular item of interest. A relatively high classification performance score for a particular item of interest may mean that a classification generated by machine learning model 304 for that item of interest is relatively accurate. Image selector 318 may be configured to select images from library 314 that comprise an item of interest that machine learning model 304 is having difficulty classifying based on the classification performance score determined with respect to that item of interest. For instance, image selector 318 may select such images with a probability proportional to the classification performance score, where lower the classification performance score, higher the probability that image selector 318 selects such images. For instance, performance analyzer 316 may provide a command 338 to image selector 318. Command 338 may specify classification performance score(s) determined for different item(s) of interest. Image selector 318 may utilize a weighting scheme, where images 310 comprising such items of interest are weighted more, thereby increasing the likelihood that such images are selected for training. Responsive to receiving command 338, image selector 318 may update its weights proportional to the classification performance score(s). For instance, image selector 318 may increase its weight for selecting images from library 314 that include item(s) of interest having a relatively low classification performance score.

In accordance with an embodiment, image selector 318 may select images from library 312 in a random fashion. It is noted that an image comprising the same container (e.g., luggage) may be selected in consecutive iterations. In accordance with another embodiment, image selector 318 may select images from library 312 in accordance with a curriculum learning-based technique, where the probability of selecting an image comprising a different container is proportional to the average performance of machine learning model 304 across all categories (e.g., items of interests on which machine learning model 304 is being trained). That is, initially, the same image (comprising the same luggage) may be utilized for training until a determination is made that the performance of machine learning model 304 with respect to identifying items of interest virtually packed in that luggage is relatively high (e.g., machine learning model 304 is able to properly classify items of interest packed in the particular type of luggage more than 90% of the time). For example, performance analyzer 316 may be configured to determine an average classification score, which is based on an average of the classification performance scores generated for different items of interest. A relatively high average classification score may indicate that machine learning model 308 is relatively accurate when classifying items of interest within a particular container. A relatively low high average classification may indicate that machine learning model 308 is relatively inaccurate when classifying items of interesting within a particular container. Image selector 318 may be configured to select images from library 312 that comprise a different type of container as machine learning model 304 gets better and better at classifying items of interest that are within a particular type of container. For instance, image selector 318 may select such images 308 with a probability corresponding to the average classification performance score, where higher the average classification performance score, higher the probability that image selector 318 selects an image from library 312 comprising a different type of container. For instance, performance analyzer 316 may provide a command 340 to image selector 318. Command 340 may specify the average classification performance score. Image selector 318 may utilize a weighting scheme, where images 310 comprising such items of interest are weighted more, thereby increasing the likelihood that such images are selected for training. Responsive to receiving command 338, image selector 318 may update its weights proportional to the classification performance score(s). For instance, image selector 318 may increase its weight for selecting images from library 312 that include a different type of container as the average classification score increases.

Each pair of images selected for a particular training iteration is provided to 3D image projector 320. 3D image projector 320 is configured to generate an image 326 that depicts a synthetically (or artificially) packed piece of luggage that comprises an item of interest. That is, image 326 is a composite of the image depicting a cleared piece of luggage (selected from library 312) and the image depicting an item of interest (selected from library 314).

To generate composite image 326, 3D image projector 320 may convert the images provided thereto into three-dimensional matrices, where each cell in the matrix corresponds to a particular voxel of a respective image. Each cell in the matrix specifies the X-coordinate, Y-coordinate, Z-coordinate, and the particle density associated with the voxel. 3D image projector 320 may randomly select a group of adjacent cells of the three-dimensional matrix generated for the image corresponding to the cleared piece of luggage and adjust the values stored therein using the values of the cells of the three-dimensional matrix generated for the image corresponding to the item of interest. In accordance with an embodiment, the item of interest may be transformed before being combined with the cleared bag. For example, the item of interest may be rotated a randomly-determined number of degrees, may be scaled in accordance with a randomly-determined scaling factor, and/or reflected across one or more randomly-selected axes (e.g., the X-axis, Y-axis, and/or Z-axis).

In accordance with a curriculum learning-based technique described above, the amount of variance in transforming the item of interest increases as machine learning model 304 gets better in recognizing that item of interest. For example, performance analyzer 316 may monitor the classification performance score (when attempting to learn to classify a particular item of interest) and determine whether the classification performance score is increasing or decreasing. As the classification performance score increases (i.e., machine learning model 304 gets better and better at classifying the particular item of interest), performance analyzer 316 may send one or more commands 342 to 3D image projector 320 that causes 3D image projector 320 to increase the amount that the particular item of interest is transformed (e.g., scaled and/or rotated). For instance, 3D image projector 320 may utilize a scaling factor to determine how much the particular item of interest is to be scaled and may utilize a rotation factor (e.g., defining a number of degrees) to determine how much the particular item of interest is to be rotated. Command(s) 342 may provide new values for the scaling factor and/or rotation factor. Alternatively, command(s) 342 may signal to 3D image projector 320 that the scaling factor and/or rotation factor are to be updated. The amount that scaling factor and/or rotation factor are to be changed may be dependent on the value of reconstruction error 336, where the scaling factor and/or rotation factor are increased as the value of reconstruction error 336 decreases. The foregoing effectively challenges machine learning model 304 to learn new scenarios for classifying a particular item of interest.

In accordance with an embodiment, after composite image 326 is generated, 3D image projector 320 may perform various post processing thereon. For instance, 3D image projector 320 may apply a natural log to particle densities at each voxel, standardize particle density values (e.g., by subtracting the mean, dividing by the standard deviation, etc.), and/or normalize particle density values so that all particle density values are in a range between 0 and 1.

As described above, to generate a batch training set, multiple pairs of images (e.g., 64) are provided to 3D image projector 320. Thus, for any given training iteration, 3D image projector 320 generates multiple composite images 326 (e.g., 64), each comprising a particular type of item of interest virtually packed into a random location of particular piece of cleared luggage. In addition, each item of interest virtually packed in a particular piece of cleared luggage may have a different orientation and/or size by virtue of the transformation performed thereon. Over the course of training machine learning model 304, hundreds of thousands of such composite images may be generated. This large training data set is generated based on a relatively small number of images (i.e., the images stored in libraries 312 and 314).

Each composite image 326 generated during a training iteration is provided to cropper 322. Cropper 322 is configured to window or crop each composite image 326 around the item of interest included therein (e.g., one quarter the size of the luggage in the image in each dimension) to generate a cropped image 330. The center and location of the item of interest within each composite image 326 is known to cropper 322 via 3D image projector 320, as 3D image projector 320 performed the insertion of the item of interest into the cleared piece of luggage. 3D image projector 320 may provide such information (e.g., voxel coordinates corresponding to the center and location of the item of interest)

to cropper 222. Initially (e.g., during earlier training iterations), the crop is centered on the item of interest. However, as machine learning model 304 improves (e.g., as reconstruction error 336 of machine learning model 304 decreases), cropper 322 effectively adds noise to the center of the window (i.e., the crop is offset from the center), thereby adding more background (i.e., other areas of the cleared piece of luggage not comprising the item of interest) within the window. The reasoning for adding noise is that during inference, the item of interest in an actual packed piece of luggage is unknown. Thus, a complete search of the bag, with windows of the same size is performed, because machine learning model 304 was trained on that window size. Cropped image 330 is provided to point sampler 324.

Point sampler 324 is configured to sample a predetermined number of voxels (e.g., 50,000) from each cropped image 330 (e.g., the X-coordinate, the Y-coordinate, the Z-coordinate, and particle density of each voxel). The points that are sampled are spaced apart, thereby reducing the likelihood that a voxel comprising an edge of the item of interest is sampled. This is performed to speed up processing and save compute resources (e.g., processing cycles, memory, storage, etc.). In addition, it also improves the accuracy of machine learning model 304 because utilizing such samples reduce the chances of the machine learning model 304 simply learning to identify the boundaries of pasted objects (which may result in an inaccurate classification). The process for selecting voxels to sample may be performed somewhat deterministically. For instance, at the beginning of training, a heatmap is generated for sampling and is utilized throughout the training process. The same heatmap is utilized for all cropped images 330 generated during training. For each voxel, the heatmap contains the probability of this voxel to be contained in the sample. When voxels are sampled according to the bitmap, voxels having zero particle density (i.e., empty space) are ignored. For relatively empty luggage, voxels having a low sampling probability according to the heatmap would be sampled. This is the non-deterministic aspect of the sampling process. The fact that the window is in a different location each time (with the heatmap moving along the window), a new point cloud sample is obtained every time this process is performed. The sampled points (shown as sampled points 332) are provided to machine learning model 304 for training.

Point sampler 324 may also be configured to label each sampled voxel as being either in the background or in the foreground. A voxel being labeled as being in the foreground means that the voxel comprises the item of interest. A voxel being labeled as being in the background means that the voxel does not comprise the item of interest. Simply stated, the item of interest is considered to be in the foreground of a virtually packed piece of luggage, and everything else is considered to be in the background. Such labels (shown as labels 334) are also provided to machine learning model 304 for training. It is noted that the labels may be generated earlier on in the synthetic data generation process. For instance, labels 334 may be generated by 3D image projector 320 or cropper 322.

As described above, a curriculum learning-based technique may be utilized to train machine learning model 304. Initially, machine learning model 304 is trained to recognize all items of interest against the same background (i.e., a single type of randomly-selected luggage). As machine learning model 304 performance improves (as reconstruction error 336 decreases), the rate at which the luggage is changed increases. With continued training, machine learning model 304 learns to recognize the item of interest against any background. Similarly, machine learning model 304 may be initially trained to recognize an item of interest in a certain orientation (e.g., an upright orientation), increasing the amount of rotation around the three axes (and/or scaling) as training progresses and improves.

Machine learning model 304 is configured to receive sampled points 332 and labels 334 generated during a training iteration (e.g., 64 sets of sampled points 332 and associated labels 334). Such data is eventually provided (e.g., in the form of feature vector(s)) to the bottleneck of the autoencoder of machine learning model 304 (e.g., autoencoder 200, as shown in FIG. 2), where an encoded representation of the data is determined. Machine learning model 304 then reconstructs the sampled points. The reconstructed sampled points are compared to the original sampled points (sampled points 332) to determine how well the reconstruction process performed. Based on the performance, the weights of the nodes of the autoencoder of machine learning model 304 are updated so that the performance is further improved in the next iteration. For instance, as described above, based on the classification predicted by machine learning model 304 and the actual labels (labels 334), machine learning model 304 outputs a reconstruction error 336. Machine learning model 304 is updated in an attempt to lower the reconstruction error 336 during the subsequent training iteration. For instance, weights utilized to produce data for subsequent layers of the neural network of machine learning model 304 may be updated.

Figure 4:
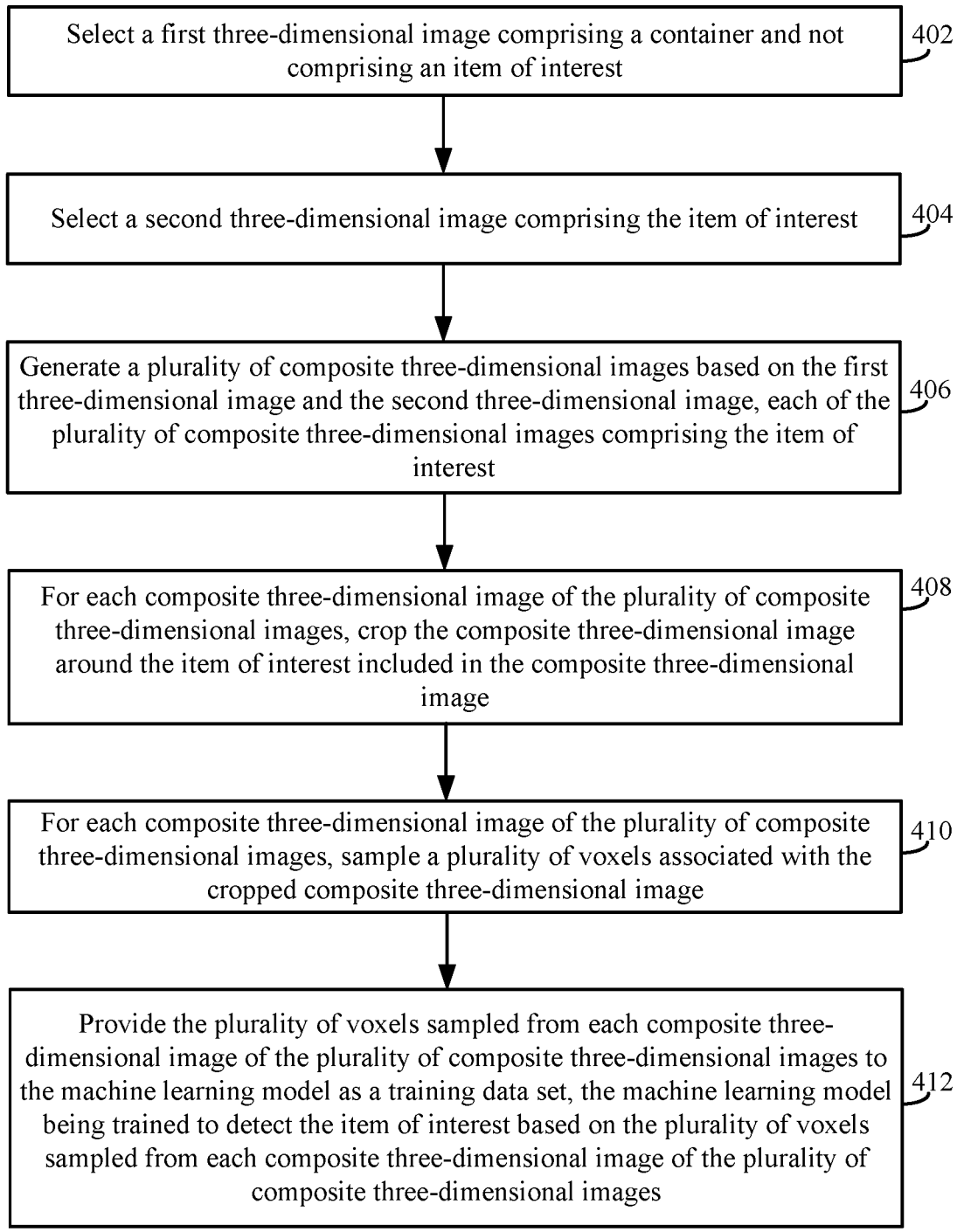
FIG. 4 shows a flowchart of a method for training a machine learning model utilizing a synthetic training data set in accordance with an example embodiment.

Accordingly, machine learning model 304 may be trained utilizing a synthetic training data set in many ways. For example, FIG. 4 shows a flowchart 400 of a method for training a machine learning model utilizing a synthetic training data set in accordance with an example embodiment. The steps of flowchart 400 occur during each iteration of one or more training iterations of a training session of a machine learning model. In an embodiment, flowchart 400 may be implemented by system 300 of FIG. 3. Accordingly, flowchart 400 will be described with reference to FIG. 3. Other structural and operational embodiments will be apparent to persons skilled in the relevant art(s) based on the discussion regarding flowchart 400 and system 300 of FIG. 3.

Flowchart 400 begins with step 402. In step 402, a first three-dimensional image is selected. The first three-dimensional image comprises a container and does not comprise an item of interest. For example, with reference to FIG. 3, image selector 318 selects a three-dimensional image from library 312.

In step 404, a second three-dimensional image is selected. The second three-dimensional image comprises the item of interest. For example, with reference to FIG. 3, image selector 318 selects a three-dimensional image from library 314.

In step 406, a plurality of composite three-dimensional images is generated based on the first three-dimensional image and the second three-dimensional image, each of the plurality of composite three-dimensional images comprising the item of interest. For example, with reference to FIG. 3, 3D image projector 320 generates a plurality of composite three-dimensional images 326 comprising the item of interest. The item of interest in each of composite three-dimensional images 326 may have a different orientation and/or be positioned in a different location within the container. Additional details regarding generating the plurality of composite three-dimensional images 326 is described below with reference to FIG. 5.

In step 408, for each composite three-dimensional image of the plurality of composite three-dimensional images, the composite three-dimensional image is cropped around the item of interest included in the composite three-dimensional image to generate a cropped image 330. For example, with reference to FIG. 3, cropper 322 crops the composite three-dimensional image 326 around the item of interest included therein. Accordingly, cropped image 330 only comprises the item of interest (and/or a relatively small portion of three-dimensional image 326 that surrounds the item of interest).

In step 410, for each composite three-dimensional image of the plurality of composite three-dimensional images, a plurality of voxels associated with the cropped composite three-dimensional image is sampled. For example, with reference to FIG. 3, point sampler 324 samples a plurality of voxels associated with cropped image 330.

In step 412, the plurality of voxels sampled from each composite three-dimensional image of the plurality of composite three-dimensional images are provided to the machine learning model as a training data set. The machine learning model is trained to detect the item of interest based on the plurality of voxels sampled from each composite three-dimensional image of the plurality of composite three-dimensional images. For example, with reference to FIG. 3, machine learning model 304 receives the plurality of voxels sampled from each composite three-dimensional image 326 (shown as sampled points 332) as a training data set. Labels 334 for each of sampled points 332 (indicating whether a particular voxel is in the foreground or background) are also provided to machine learning model 304. Machine learning model 304 is trained to detect the item of interest based on sampled points 332 and labels 334.

Figure 5:
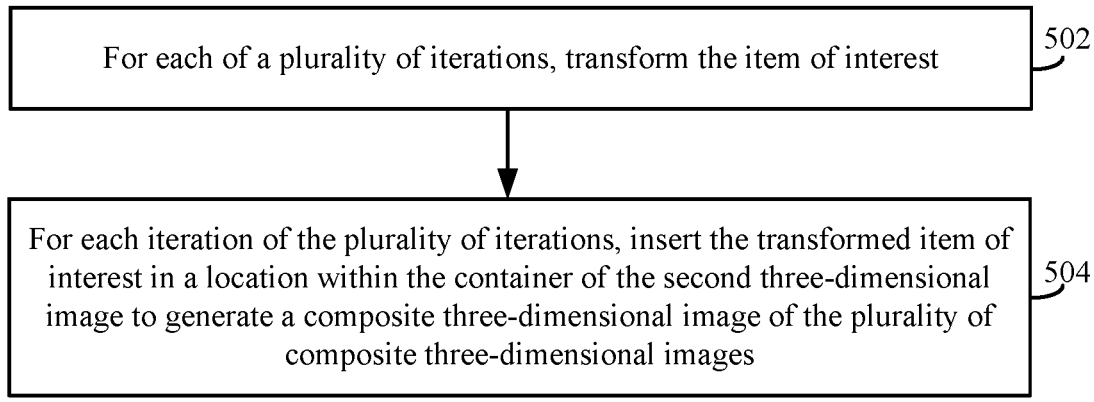
FIG. 5 shows a flowchart of a method for generating a plurality of composite three-dimensional images in accordance with an example embodiment.
Figure 6:
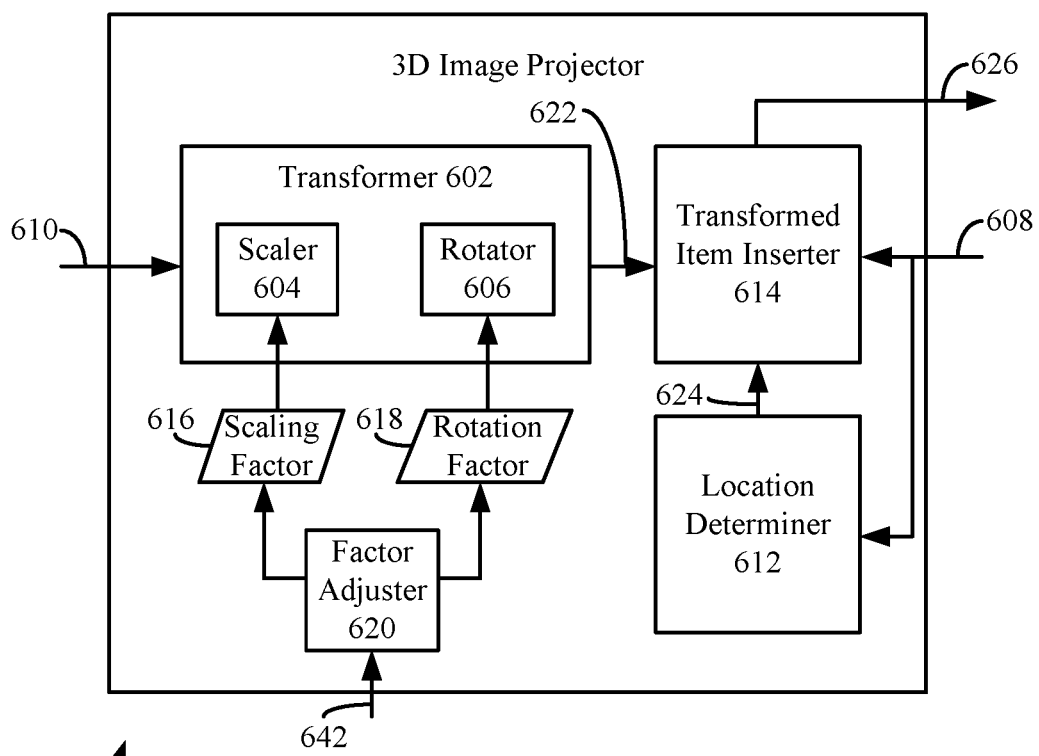
FIG. 6 depicts a block diagram of a 3D image projector in accordance with an example embodiment.

FIG. 5 shows a flowchart 500 of a method for generating a plurality of composite three-dimensional images in accordance with an example embodiment. In an embodiment, flowchart 500 may be implemented by a 3D image projector, such as 3D image projector 600 of FIG. 6. Accordingly, flowchart 500 will be described with reference to FIG. 6. FIG. 6 depicts a block diagram of 3D image projector 600 in accordance with an example embodiment. 3D image projector 600 is an example of 3D image projector 320, as described above with reference to FIG. 3. As shown in FIG. 6, 3D image projector 600 comprises a transformer 502, a transformed item inserter 614, a location determiner 612, and a factor adjuster 620. Other structural and operational embodiments will be apparent to persons skilled in the relevant art(s) based on the discussion regarding flowchart 500 and 3D image projector 600 of FIG. 6.

Flowchart 500 begins with step 502. In step 502, for each of a plurality of iterations, the item of transformed. For example, with reference to FIG. 6, transformer 502 is configured to receive an image 610 comprising the item of interest. Image 610 is an example of image 310 and may be received from library 314, as described above with reference to FIG. 3. Transformer 602 is configured to transform the item of interest included in image 610.

In accordance with one or more embodiments, transforming the item of interest comprises at least one of scaling the item of interest in accordance with a scaling factor or rotating the item of interest in accordance with a rotation factor. For example, with reference to FIG. 6, transformer 502 may include a scaler 604 and/or a rotator 606. Image 610 may be provided to scaler 604, which scales image 610 (i.e., the item of interest included therein) in accordance with a scaling factor 616. Scaling factor 616 may comprise a multiplier value that is utilized to multiply voxel values corresponding to the item of interest in accordance with multiplier value. Examples of scaling include, but are not limited to, increasing the size of the item of interest or decreasing the size of the item of interest. In accordance with an embodiment, a relatively small amount to noise may be added to the item of interest so that machine learning model 304 becomes resilient against slight variations in material (e.g., a gorilla skull with reduced bone density) or scanner 305 performance. The noise may be added by multiplying the voxel values corresponding to the item of interest by a noise factor. The scaled image may then be rotated by rotator 606 in accordance with a rotation factor 618. Rotation factor 618 may comprise a degree value which specifies a number of degrees by which image 610 is to be rotated. It is noted that, alternatively, image 610 may be rotated first by rotator 606 and then scaled by scaler 604. The transformed item of interest (shown as transformed item of interest 622) is provided to transformed item inserter 614.

In step 504, for each of the plurality of iterations, the transformed item of interest is inserted in a location within the container of the first three-dimensional image to generate a composite three-dimensional image of the plurality of composite three-dimensional images. For example, with reference to FIG. 6, location determiner 612 is configured to determine a location (e.g., a random location) within a container included in image 608. Image 608 is an example of image 308 and may be received from library 312, as described above with reference to FIG. 3. The determined location (shown as location 624) is provided to transformed item inserter 614. Transformed item inserter 614 is configured to insert transformed item of interest 622 at location 624 of the container included in image 608 to generate a composite three-dimensional image 626. Composite three-dimensional image 626 is an example of composite three-dimensional 326, as described above with reference to FIG. 3.

In accordance with one or more embodiments, to generate composite image 626, 3D image projector 600 may convert images 608 and 610 into three-dimensional matrices, where each cell in the matrix corresponds to a particular voxel of a respective image. Each voxel comprises the particle density of the corresponding X-coordinate, Y-coordinate, and Z-coordinate. 3D image projector 600 may randomly select a group of adjacent cells of the three-dimensional matrix generated for image 608 (corresponding to the cleared piece of luggage) and adjust the values stored therein using the values of the cells of the three-dimensional matrix generated for image 610 (corresponding to the item of interest).

In accordance with one or more embodiments, the amount of variance in transforming the item of interest increases as a reconstruction error of the machine learning model is decreased. For example, with reference to FIG. 6, in accordance with a curriculum learning-based technique described above, the amount of variance in transforming the item of interest increases as the machine learning model (e.g., machine learning model 304, as shown in FIG. 3) gets better in recognizing that item of interest. For example, factor adjustor 620 may receive one or more commands 642 from a performance analyzer (e.g., performance analyzer 316, as described above with reference to FIG. 3) when the performance analyzer detects that the reconstruction error (e.g., reconstruction error 336, as shown in FIG. 3) is decreased. Command(s) 642 are examples of command(s) 342, as described above with reference to FIG. 3). Responsive to receiving command(s) 642, factor adjuster 620 increases the values of scaling factor 616 and/or rotation factor 618. The amount that scaling factor 616 and/or rotation factor 618 are to be changed may be dependent on the value of reconstruction error 336, where scaling factor 616 and/or rotation factor 618 are increased as the value of reconstruction error 336 decreases.

Figure 7:
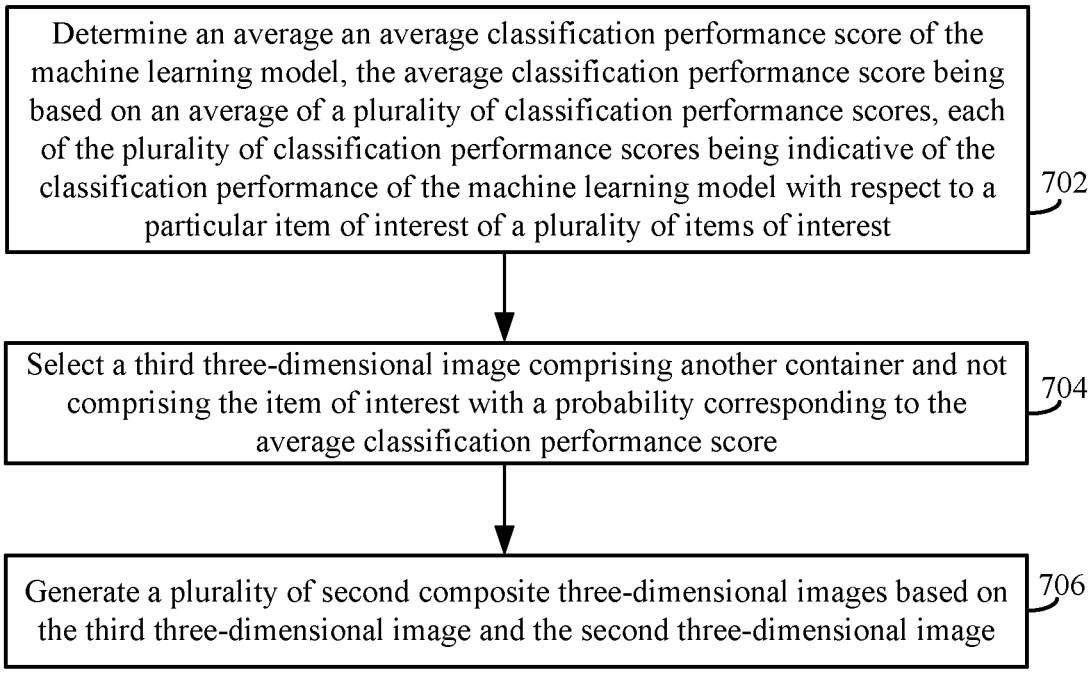
FIG. 7 shows a flowchart of a method for training a machine learning model to detect an item of interest in a different type of container in accordance with an example embodiment.

In accordance with one or more embodiments, machine learning model 304 switches to detecting an item of interest in a different type of container based on a reconstruction error of machine learning model 304. For example, FIG. 7 shows a flowchart 700 of a method for training a machine learning model to detect an item of interest in a different type of container in accordance with an example embodiment. In an embodiment, flowchart 700 may be implemented by system 300 of FIG. 3. Accordingly, flowchart 700 will be described with reference to FIG. 3. Other structural and operational embodiments will be apparent to persons skilled in the relevant art(s) based on the discussion regarding flowchart 700 and system 300 of FIG. 3.

Flowchart 700 begins with step 702. In step 702, an average classification performance score of the machine learning model is determined, the average classification performance score being based on an average of a plurality of classification performance scores, each of the plurality of classification performance scores being indicative of the classification performance of the machine learning model with respect to a particular item of interest of a plurality of items of interest. For example, with reference to FIG. 3, performance analyzer 316 may determine the average classification performance score.

In step 704, a third three-dimensional image comprising another container and not comprising the item of interest is selected with a probability corresponding to the average classification performance score. For example, with reference to FIG. 3, performance analyzer 316 may provide a command 340 (e.g., comprising the average classification performance score) to image selector 318 that causes image selector 318 to select an image from library 312 with a probability corresponding to the average classification performance score.

In step 706, a plurality of second composite three-dimensional images based on the third three-dimensional image and the second three-dimensional image is generated. For example, with reference to 3D image projector 320 generates a plurality of second composite three-dimensional images based on the third three-dimensional image and the second three-dimensional image. The method then continues in a similar fashion as described above with reference to FIG. 4, where steps 408, 410, and 412 are performed based on the second composite three-dimensional images.

Figure 8:
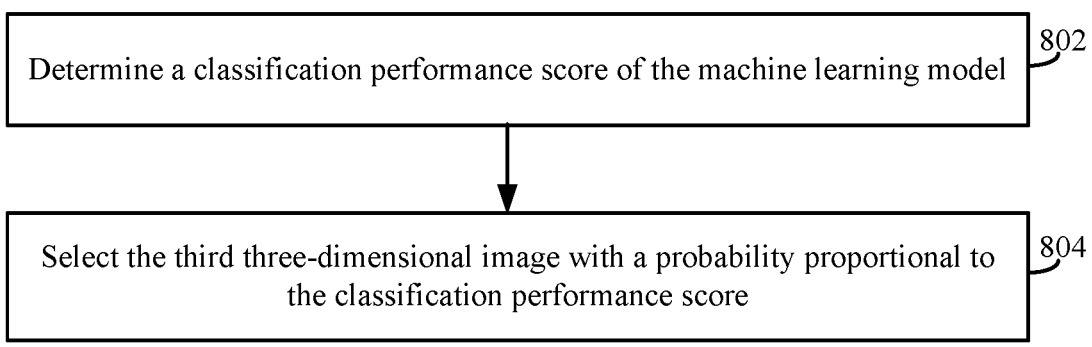
FIG. 8 shows a flowchart of a method for selecting an item of interest to train a machine learning model in accordance with an example embodiment.

In accordance with one or more embodiments, the three-dimensional image comprising the item of interest is selected based on a reconstruction error of machine learning model 304, where three-dimensional images comprising items of interest that machine learning model 304 is having difficulty recognizing will have a higher chance of being selected to speed up the training process. For example, FIG. 8 shows a flowchart 800 of a method for selecting an item of interest to train a machine learning model in accordance with an example embodiment. In an embodiment, flowchart 800 may be implemented by system 300 of FIG. 3. Accordingly, flowchart 800 will be described with reference to FIG. 3. Other structural and operational embodiments will be apparent to persons skilled in the relevant art(s) based on the discussion regarding flowchart 800 and system 300 of FIG. 3. The following is described in the context of selecting the second three-dimensional image of step 404.

Flowchart 800 begins with step 802. In step 802, a classification performance score of the machine learning model is determined. For example, with reference to FIG. 3, performance analyzer 316 may determine the classification performance score of machine learning model 304.

In step 804, the second three-dimensional image is selected with a probability proportional to the classification performance score. For example, with reference to FIG. 3, performance analyzer 316 may provide a command 338 (comprising the classification performance score) to image selector 318 that causes image selector 318 to select a three-dimensional image from library 314 that includes the item of interest with a probability proportional to the classification performance score.

After training is completed, machine learning model 304 is applied to a test set of genuinely packed bags to establish the appropriate threshold on the confidence level of machine learning model 304. This threshold can be set individually for each item of interest category. For example, for more threatening objects (e.g., firearms), organizations are willing to tolerate a higher false positive rate but require a minimal false negative rate. On the other hand, for smuggled objects that do not represent an immediate threat to human life, a relatively higher false negative rate is acceptable, while the tolerance for high false positives is low. Confidence thresholds can be adjusted on the fly in the deployed solution, to respond to changes in threat levels, either based on the identification of the bag owner or general increases in threat level.

Figure 9:
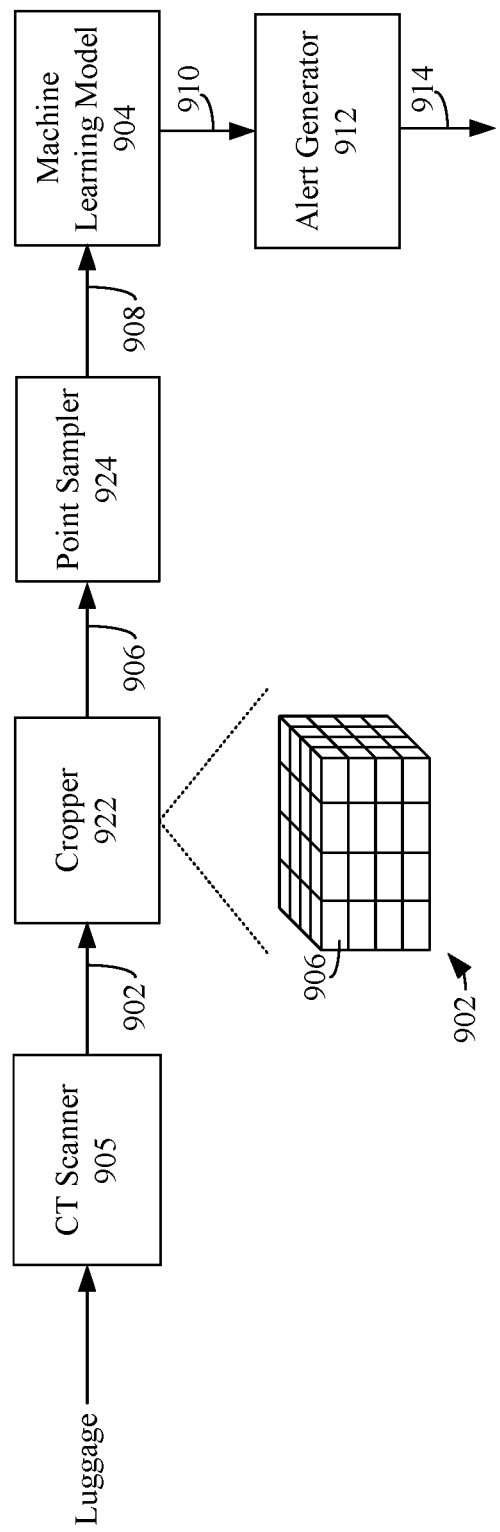
FIG. 9 is a block diagram of a system configured to classify new data items via a machine learning model in accordance with an example embodiment.

After training of machine learning model 304 is complete, machine learning model 304 is deployed (e.g., at an airport) and utilized to classify new data items. FIG. 9 is a block diagram of a system 900 configured to classify new data items via a machine learning model in accordance with an example embodiment. As shown in FIG. 9, system 900 comprises a CT scanner 905, a cropper 922, a point sampler 924, and a machine learning model 904. CT scanner 905, cropper 922, point sampler 924, and machine learning model 904 are examples of CT scanner 305, cropper 322, point sampler 324, and machine learning model 304, as respectively described above with reference to FIG. 3.

As shown in FIG. 9, a new data item (e.g., a piece of luggage) is provided to CT scanner 905, which scans the luggage and outputs a 3D image 902. 3D image 902 is provided to cropper 922. Cropper 922 is configured to generate a plurality of segmented windows 906 (or partial 3D images) of 3D image 902 by cropping 3D image 902 a predetermined distance along each of the X-axis, Y-axis, and Z-axis (e.g., one quarter along each axis). For instance, as shown in FIG. 9, 3D image 902 is segmented into sixty four windows 906. It is noted that 3D image 902 may be segmented into any number of windows and that the number of windows described herein are purely exemplary. Each of windows 906 is provided to point sampler 924.

Point sampler 924 is configured to sample a predetermined number of voxels (e.g., 50,000) from each window 906 in a similar manner as described above with reference to point sampler 324 of FIG. 3. The sampled points (or voxels) (shown as sampled points 908) are provided to machine learning model 904.

For each window 906, machine learning model 904 is configured to analyze each of sampled points 908 thereof and make a determination (e.g., generate a classification) as to whether each of sampled points 908 is in the foreground (i.e., is part of an item of interest) or in the background (i.e., not part of an item of interest). Based on analysis of sampled points 908 of one or more of windows 906, machine learning model 904 outputs a final classification 910. Classification 910 comprises one or more probabilities. Each of the probability(ies) indicates a likelihood that the luggage (corresponding to 3D image 902) comprises a respective item of interest (e.g., 90% probability that the luggage comprises an illegal tusk of ivory, a 5% probability that the luggage comprises an illegal gorilla skull, etc.). In accordance with an embodiment, classification 910 may be based on each classification generated for each respective sampled point of sampled points 908 of a respective window 906. For instance, each classification generated for a corresponding window 906 may be averaged together to generate s classification for that window 906. Then, each classification generated for a respective window 906 may be averaged together to generate classification 910. It is noted that other techniques may be utilized to determine classification 910 based on the analysis of sampled points 908 of windows 906. Classification 910 is provided to alert generator 912.

Alert generator 912 may be configured to generate an alert in response to classification 910 indicating a probability meets a threshold condition (e.g., an equivalence condition, a greater than condition, a less than condition, etc.). If a determination is made that a probability meets the threshold condition (e.g., reaches or exceeds a predetermined threshold of 90%), then an alert 914 may be generated. Alert 914 may be provided to one or more computing devices, displayed via a graphical user interface (GUI) of such computing device(s), and/or played back via computing device(s). For instance, alert 914 may comprise an audio signal being played back on a speaker coupled to such computing device(s), an activation of one or more light sources (e.g., a light bulb, a light emitting diode (LED), etc.), a short messaging service (SMS) message or e-mail message sent to or a telephone call made to a mobile device of the user, etc. Examples of such computing device(s) include, but are not limited to, any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer).

Figure 10:
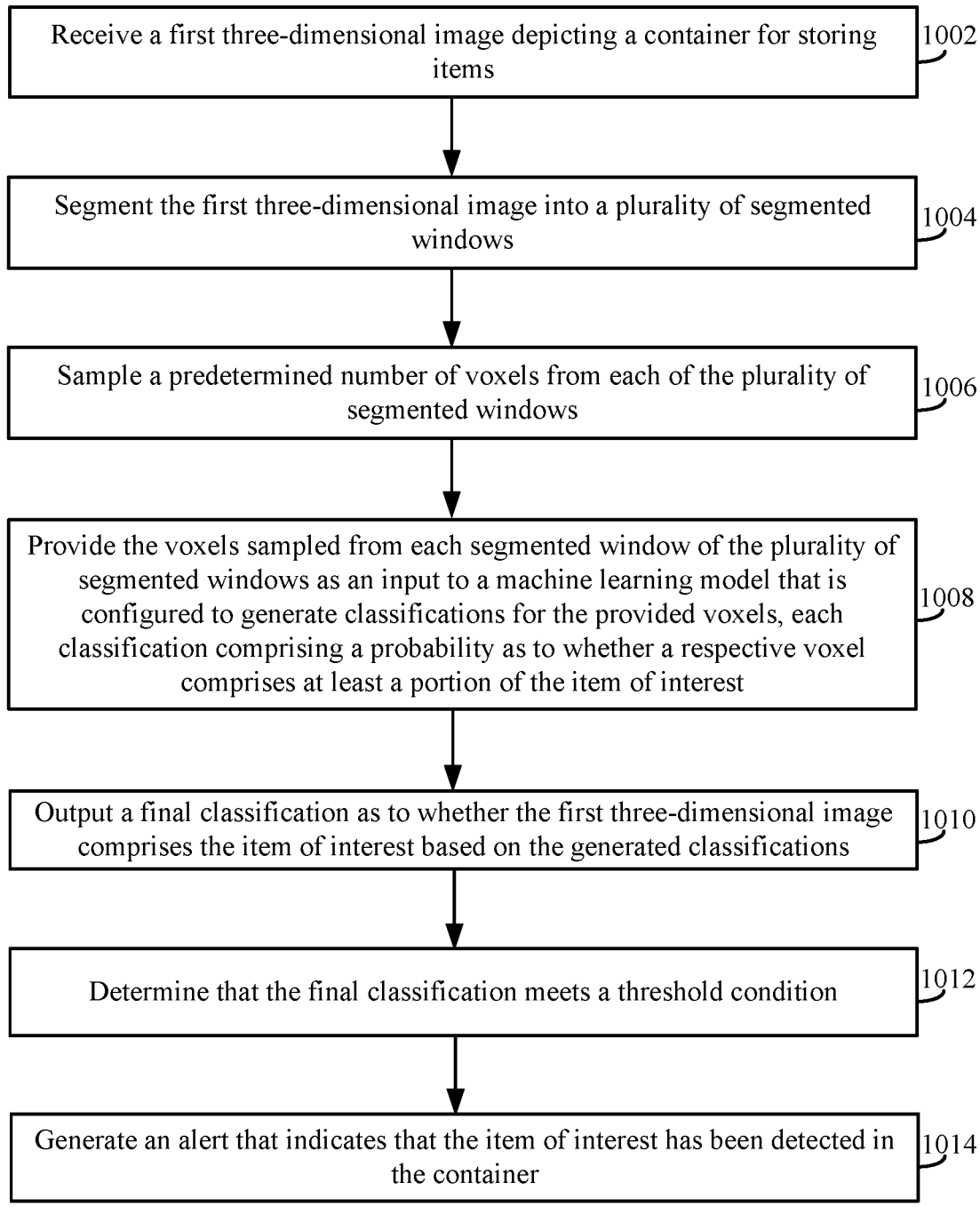
FIG. 10 shows a flowchart of a method for detecting and classifying an item of interest via a machine learning model in accordance with an example embodiment.

Accordingly, a machine learning model may be utilized to detect and classify an item of interest in many ways. For example, FIG. 10 shows a flowchart 1000 of a method for detecting and classifying an item of interest via a machine learning model in accordance with an example embodiment. In an embodiment, flowchart 1000 may be implemented by system 900 of FIG. 9. Accordingly, flowchart 900 will be described with continued reference to FIG. 9. Other structural and operational embodiments will be apparent to persons skilled in the relevant art(s) based on the discussion regarding flowchart 1000 and system 900 of FIG. 9.

Flowchart 1000 begins with step 1002. In step 1002, a first three-dimensional image depicting a container for storing items is received. For example, with reference to FIG. 9, cropper 922 receives three-dimensional image 902 that is generated by CT scanner 905. Three-dimensional image 902 depicts a container for storing items (e.g., luggage).

In step 1004, the first three-dimensional image is segmented into a plurality of segmented windows. For example, with reference to FIG. 9, cropper 922 segments three-dimensional image 902 into a plurality of segmented windows 906.

In step 1006, a predetermined number of voxels are sampled from each of the plurality of segmented windows. For example, with reference to FIG. 9, point sampler 924 samples a predetermined number of voxels from each of windows 906.

In step 1008, the voxels sampled from each segmented window of the plurality of segmented windows is provided as an input to a machine learning model that is configured to generate classifications for the provided voxels, each classification comprising a probability as to whether a respective voxel comprises at least a portion of the item of interest. For example, with reference to FIG. 9, machine learning model 904 receives sampled voxels 908 as an input. Machine learning model 904 is configured to generate classifications for sampled voxels 908 for each window 906. Each classification comprises a probability as to whether a respective voxel from sampled voxels 908 comprises at least a portion of the item of interest.

In accordance with one or more embodiments, the machine learning model is an artificial neural network-based machine learning model. For example, with reference to FIG. 9, machine learning model 904 is an artificial neural network-based machine learning model.

In step 1010, a final classification is outputted as to whether the first three-dimensional image comprises the item of interest based on the generated classifications. For example, with reference to FIG. 9, machine learning model 804 outputs final classification 910 as to whether three-dimensional image 902 comprises the item of interest. Final classification 910 is provided to alert generator 912.

In step 1012, a determination is made that the final classification meets a threshold condition. For example, with reference to FIG. 9, alert generator 912 determines that final classification 910 meets a threshold condition.

In step 1014, an alert is generated that the item of interest has been detected in the container. For example, with reference to FIG. 9, alert generator 912 generates alert 914 that the item of interest has been detected in the container (i.e., the luggage).

III. Example Computer System Implementation

The systems and methods described above in reference to FIGS. 1-10, may be implemented in hardware, or hardware combined with one or both of software and/or firmware. For example, system 1100 of FIG. 11 may be used to implement synthetic training data generator 102, machine learning model 104, autoencoder 200, preprocessor 306, synthetic training data generator 302, image selector 318, 3D image projector 320, cropper 322, point sampler 324, machine learning model 304, performance analyzer 316, 3D image projector 600, transformer 602, scaler 604, rotator 606, transformed item inserter 614, location determiner 612, cropper 922, point sampler 924, machine learning model 904, and/or any of the components respectively described therein, and/or flowcharts 400, 500 700, 800, and/or 1000 may be each implemented as computer program code/instructions configured to be executed in one or more processors and stored in a computer readable storage medium. Alternatively, any of synthetic training data generator 102, machine learning model 104, autoencoder 200, preprocessor 306, synthetic training data generator 302, image selector 318, 3D image projector 320, cropper 322, point sampler 324, machine learning model 304, performance analyzer 316, 3D image projector 600, transformer 602, scaler 604, rotator 606, transformed item inserter 614, location determiner 612, cropper 922, point sampler 924, machine learning model 904, and/or any of the components respectively described therein, and/or flowcharts 400, 500 700, 800, and/or 1000 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions. The description of system 500 provided herein is provided for purposes of illustration, and is not intended to be limiting. Embodiments may be implemented in further types of computer systems, as would be known to persons skilled in the relevant art(s).

Figure 11:
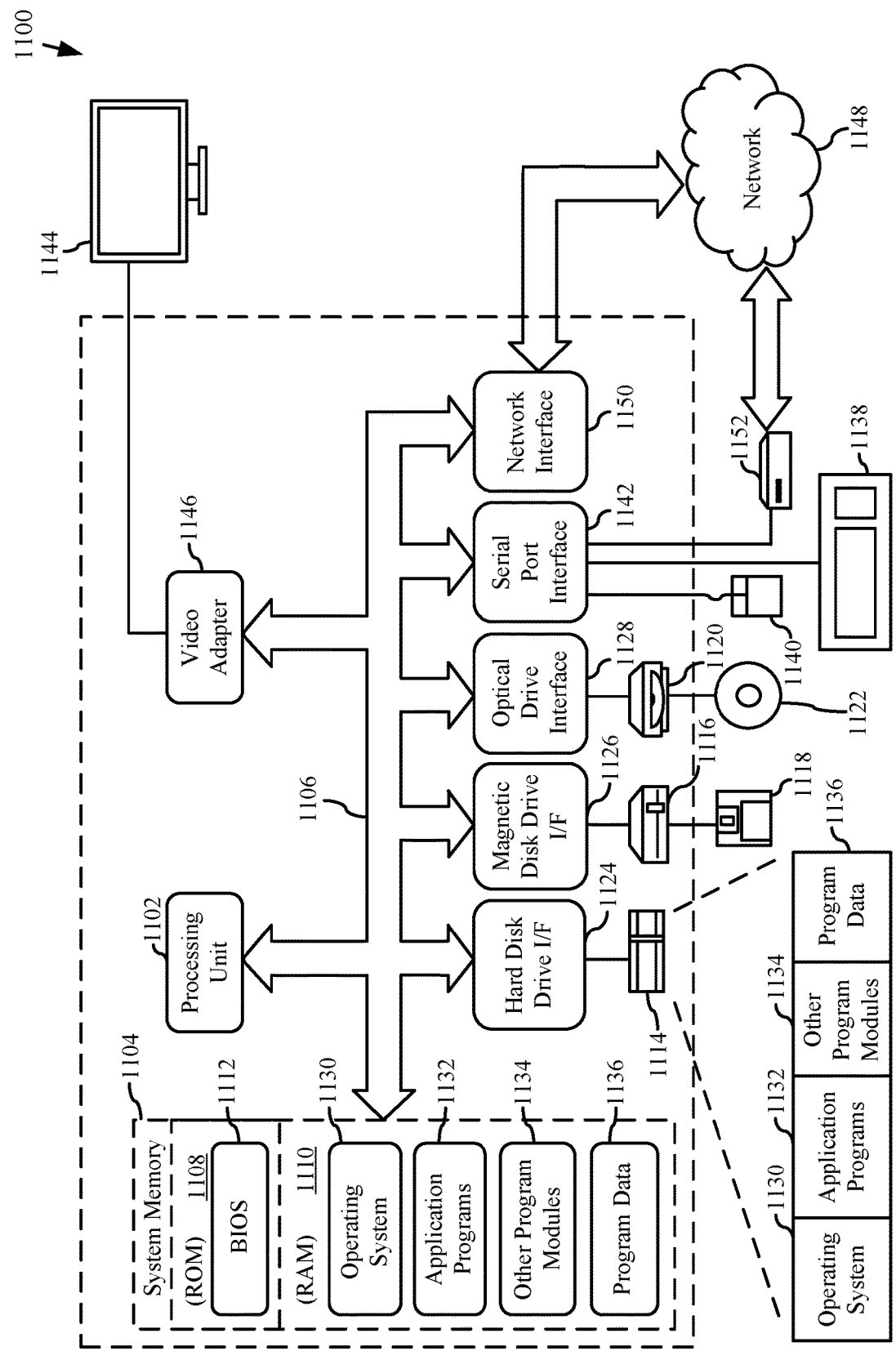
FIG. 11 is a block diagram of an example processor-based computer system that may be used to implement various embodiments.

As shown in FIG. 11, system 1100 includes a processing unit 1102, a system memory 1104, and a bus 1106 that couples various system components including system memory 1104 to processing unit 1102. Processing unit 1102 may comprise one or more circuits, microprocessors or microprocessor cores. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

System 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, BLU-RAY™ disk or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as solid-state drives, flash memory cards, digital video disks, random access memories (RAMs), read only memories (ROM), and the like.

A number of program modules may be stored on the hard disk, magnetic disk, optical disk, ROM, or RAM. These program modules include an operating system 1130, one or more application programs 1132, other program modules 1134, and program data 1136. In accordance with various embodiments, the program modules may include computer program logic that is executable by processing unit 1102 to perform any or all of the functions and features of any of synthetic training data generator 102, machine learning model 104, autoencoder 200, preprocessor 306, synthetic training data generator 302, image selector 318, 3D image projector 320, cropper 322, point sampler 324, machine learning model 304, performance analyzer 316, 3D image projector 600, transformer 602, scaler 604, rotator 606, transformed item inserter 614, location determiner 612, cropper 922, point sampler 924, machine learning model 904, and/or any of the components respectively described therein, and/or flowcharts 400, 500 700, 800, and/or 1000, and/or any of the components respectively described therein, as described above. The program modules may also include computer program logic that, when executed by processing unit 1102, causes processing unit 1102 to perform any of the steps of the flowcharts of FIGS. 4, 5, 7, 8, and/o 10, as described above.

A user may enter commands and information into system 1100 through input devices such as a keyboard 1138 and a pointing device 1140 (e.g., a mouse). Other input devices (not shown) may include a microphone, joystick, game controller, scanner, or the like. In one embodiment, a touch screen is provided in conjunction with a display 1144 to allow a user to provide user input via the application of a touch (as by a finger or stylus for example) to one or more points on the touch screen. These and other input devices are often connected to processing unit 1102 through a serial port interface 1142 that is coupled to bus 1106, but may be connected by other interfaces, such as a parallel port, game port, or a universal serial bus (USB). Such interfaces may be wired or wireless interfaces.

Display 1144 is connected to bus 1106 via an interface, such as a video adapter 1146. In addition to display 1144, system 1100 may include other peripheral output devices (not shown) such as speakers and printers.

System 1100 is connected to a network 1148 (e.g., a local area network or wide area network such as the Internet) through a network interface 1150, a modem 1152, or other suitable means for establishing communications over the network. Modem 1152, which may be internal or external, is connected to bus 1106 via serial port interface 1142.

As used herein, the terms "computer program medium," "computer-readable medium," and "computer-readable storage medium" are used to generally refer to memory devices or storage structures such as the hard disk associated with hard disk drive 1114, removable magnetic disk 1118, removable optical disk 1122, as well as other memory devices or storage structures such as flash memory cards, digital video disks, random access memories (RAMs), read only memories (ROM), and the like. Such computer-readable storage media are distinguished from and non-overlapping with communication media and propagating signals (do not include communication media and propagating signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media. Embodiments are also directed to such communication media that are separate and non-overlapping with embodiments directed to computer-readable storage media.

As noted above, computer programs and modules (including application programs 1132 and other program modules 1134) may be stored on the hard disk, magnetic disk, optical disk, ROM, or RAM. Such computer programs may also be received via network interface 1150, serial port interface 1142, or any other interface type. Such computer programs, when executed or loaded by an application, enable system 1100 to implement features of embodiments discussed herein. Accordingly, such computer programs represent controllers of the system 1100.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, solid state drives, floppy disks, CD ROMs, DVD ROMs, zip disks, tapes, magnetic storage devices, optical storage devices, MEMs, nanotechnology-based storage devices, and the like.

IV. Further Example Embodiments

A system for detecting an item of interest in a container is described herein. The system includes at least one processor circuit; and at least one memory that stores program code configured to be executed by the at least one processor circuit, the program code comprising: a cropper configured to: receive a first three-dimensional image depicting a container for storing items; and segment the first three-dimensional image into a plurality of segmented windows; a point sampler configured to: sample a predetermined number of voxels from each of the plurality of segmented windows; and provide the voxels sampled from each segmented window of the plurality of segmented windows as an input to a machine learning model that is configured to generate classifications for the provided voxels, each classification comprising a probability as to whether a respective voxel comprises at least a portion of the item of interest, the machine learning model being configured to output a final classification as to whether the first three-dimensional image comprises the item of interest based on the generated classifications; and an alert generator configured to: determine that the final classification meets a threshold condition; and responsive to a determination that the final classification meets the threshold condition, generate an alert that indicates that the item of interest has been detected in the container.

In an implementation of the system, the machine learning model is an artificial neural network-based machine learning model.

In an implementation of the system, the system further comprises: a synthetic training data generator configured to, during each iteration of a training session for the machine learning model: select a second three-dimensional image comprising the container and not comprising the item of interest; select a third three-dimensional image comprising the item of interest; generate a plurality of composite three-dimensional images based on the second three-dimensional image and the third three-dimensional image, each of the plurality of composite three-dimensional images comprising the item of interest; for each composite three-dimensional image of the plurality of composite three-dimensional images: crop the composite three-dimensional image around the item of interest included in the composite three-dimensional image; and sample a plurality of voxels associated with the cropped composite three-dimensional image; and provide the plurality of voxels sampled from each composite three-dimensional image of the plurality of composite three-dimensional images to the machine learning model as a training data set, the machine learning model being trained to detect the item of interest based on the plurality of voxels sampled from each composite three-dimensional image of the plurality of composite three-dimensional images.

In an implementation of the system, the synthetic training generator is configured to generate the plurality of composite three-dimensional images by: for each of a plurality of iterations: transforming the item of interest; and inserting the transformed item of interest in a location within the container of the second three-dimensional image to generate a composite three-dimensional image of the plurality of composite three-dimensional images.

In an implementation of the system, the synthetic training generator is configured to transform the item of interest by performing at least one of: scaling the item of interest in accordance with a scaling factor; or rotating the item of interest in accordance with a rotation factor.

In an implementation of the system, the synthetic training data generator is configured to increase an amount of variance in transforming the item of interest as a classification performance score of the machine learning model is increased.

In an implementation of the system, the system further comprises a performance analyzer configured to determine an average classification performance score of the machine learning model, the average classification performance score being based on an average of a plurality of classification performance scores, each of the plurality of classification performance scores being indicative of the classification performance of the machine learning model with respect to a particular item of interest of a plurality of items of interest, and wherein the synthetic training data generator is configured to: select a fourth three-dimensional image comprising another container and not comprising the item of interest with a probability corresponding to the average classification performance score; and generate a plurality of second composite three-dimensional images based on the fourth three-dimensional image and the third three-dimensional image.

In an implementation of the system, the system further comprises a performance analyzer configured to determine a classification performance score of the machine learning model, and wherein the synthetic training data generator is configured to: select the third three-dimensional image with a probability proportional to the classification performance score.

A method for detecting an item of interest in a container is also described herein. The method includes: receiving a first three-dimensional image depicting a container for storing items; segmenting the first three-dimensional image into a plurality of segmented windows; sampling a predetermined number of voxels from each of the plurality of segmented windows; providing the voxels sampled from each segmented window of the plurality of segmented windows as an input to a machine learning model that is configured to generate classifications for the provided voxels, each classification comprising a probability as to whether a respective voxel comprises at least a portion of the item of interest; outputting a final classification as to whether the first three-dimensional image comprises the item of interest based on the generated classifications; determining that the final classification meets a threshold condition; and responsive to said determining that the final classification meets the threshold condition, generating an alert that indicates that the item of interest has been detected in the container.

In one implementation of the method, the machine learning model is an artificial neural network-based machine learning model.

In one implementation of the method, the method further comprises: during each iteration of a training session for the machine learning model: selecting a second three-dimensional image comprising the container and not comprising the item of interest; selecting a third three-dimensional image comprising the item of interest; generating a plurality of composite three-dimensional images based on the second three-dimensional image and the third three-dimensional image, each of the plurality of composite three-dimensional images comprising the item of interest; for each composite three-dimensional image of the plurality of composite three-dimensional images: cropping the composite three-dimensional image around the item of interest included in the composite three-dimensional image; and sampling a plurality of voxels associated with the cropped composite three-dimensional image; and providing the plurality of voxels sampled from each composite three-dimensional image of the plurality of composite three-dimensional images to the machine learning model as a training data set, the machine learning model being trained to detect the item of interest based on the plurality of voxels sampled from each composite three-dimensional image of the plurality of composite three-dimensional images.

In one implementation of the method, generating the plurality of composite three-dimensional images comprises: for each of a plurality of iterations: transforming the item of interest; and inserting the transformed item of interest in a location within the container of the second three-dimensional image to generate a composite three-dimensional image of the plurality of composite three-dimensional images.

In one implementation of the method, transforming the item of interest comprises at least one of: scaling the item of interest in accordance with a scaling factor; or rotating the item of interest in accordance with a rotation factor.

In one implementation of the method an amount of variance in transforming the item of interest increases as a classification performance score of the machine learning model is increased.

In one implementation of the method, the method further comprises: determining an average classification performance score of the machine learning model, the average classification performance score being based on an average of a plurality of classification performance scores, each of the plurality of classification performance scores being indicative of the classification performance of the machine learning model with respect to a particular item of interest of a plurality of items of interest; selecting a fourth three-dimensional image comprising another container and not comprising the item of interest with a probability corresponding to the average classification performance score; and generating a plurality of second composite three-dimensional images based on the fourth three-dimensional image and the third three-dimensional image.

In one implementation of the method, the method further comprises: selecting the third three-dimensional image comprising the item of interest comprises: determining a classification performance score of the machine learning model; and selecting the third three-dimensional image with a probability proportional to the classification performance score.

A computer-readable storage medium having program instructions recorded thereon that, when executed by a processor of a computing device, perform a method for detecting an item of interest in a container. The method includes: receiving a first three-dimensional image depicting a container for storing items; segmenting the first three-dimensional image into a plurality of segmented windows; sampling a predetermined number of voxels from each of the plurality of segmented windows; providing the voxels sampled from each segmented window of the plurality of segmented windows as an input to a machine learning model that is configured to generate classifications for the provided voxels, each classification comprising a probability as to whether a respective voxel comprises at least a portion of the item of interest; outputting a final classification as to whether the first three-dimensional image comprises the item of interest based on the generated classifications; determining that the final classification meets a threshold condition; and responsive to said determining that the final classification meets the threshold condition, generating an alert that indicates that the item of interest has been detected in the container.

In an implementation of the computer-readable storage medium, the machine learning model is an artificial neural network-based machine learning model.

In an implementation of the computer-readable storage medium, the method further comprises: during each iteration of a training session for the machine learning model: selecting a second three-dimensional image comprising the container and not comprising the item of interest; selecting a third three-dimensional image comprising the item of interest; generating a plurality of composite three-dimensional images based on the second three-dimensional image and the third three-dimensional image, each of the plurality of composite three-dimensional images comprising the item of interest; for each composite three-dimensional image of the plurality of composite three-dimensional images: cropping the composite three-dimensional image around the item of interest included in the composite three-dimensional image; and sampling a plurality of voxels associated with the cropped composite three-dimensional image; and providing the plurality of voxels sampled from each composite three-dimensional image of the plurality of composite three-dimensional images to the machine learning model as a training data set, the machine learning model being trained to detect the item of interest based on the plurality of voxels sampled from each composite three-dimensional image of the plurality of composite three-dimensional images.

In an implementation of the computer-readable storage medium, generating the plurality of composite three-dimensional images comprises: for each of a plurality of iterations: transforming the item of interest; and inserting the transformed item of interest in a location within the container of the second three-dimensional image to generate a composite three-dimensional image of the plurality of composite three-dimensional images.

V Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A system for detecting an item of interest in a container, comprising:
    at least one processor circuit; and
    at least one memory that stores program code configured to be executed by the at least one processor circuit, the program code comprising:
    a cropper configured to:
      receive a first three-dimensional image depicting a container for storing items; and
      segment the first three-dimensional image into a plurality of segmented windows;
    a point sampler configured to:
      sample a predetermined number of voxels from each of the plurality of segmented windows; and
      provide the voxels sampled from each segmented window of the plurality of segmented windows as an input to a machine learning model that is configured to generate classifications for the provided voxels, each classification comprising a probability as to whether a respective voxel comprises at least a portion of the item of interest, the machine learning model being configured to output a final classification as to whether the first three-dimensional image comprises the item of interest based on the generated classifications; and an alert generator configured to:
  determine that the final classification meets a threshold condition; and
  responsive to a determination that the final classification meets the threshold condition, generate an alert that indicates that the item of interest has been detected in the container.

2. The system of claim 1, wherein the machine learning model is an artificial neural network-based machine learning model.

3. The system of claim 1, further comprising:
  a synthetic training data generator configured to, during each iteration of a training session for the machine learning model:
    select a second three-dimensional image comprising the container and not comprising the item of interest;
    select a third three-dimensional image comprising the item of interest;
    generate a plurality of composite three-dimensional images based on the second three-dimensional image and the third three-dimensional image, each of the plurality of composite three-dimensional images comprising the item of interest;
    for each composite three-dimensional image of the plurality of composite three-dimensional images:
      crop the composite three-dimensional image around the item of interest included in the composite three-dimensional image; and
      sample a plurality of voxels associated with the cropped composite three-dimensional image; and
    provide the plurality of voxels sampled from each composite three-dimensional image of the plurality of composite three-dimensional images to the machine learning model as a training data set, the machine learning model being trained to detect the item of interest based on the plurality of voxels sampled from each composite three-dimensional image of the plurality of composite three-dimensional images.

4. The system of claim 3, wherein the synthetic training generator is configured to generate the plurality of composite three-dimensional images by:
  for each of a plurality of iterations:
    transforming the item of interest; and
    inserting the transformed item of interest in a location within the container of the second three-dimensional image to generate a composite three-dimensional image of the plurality of composite three-dimensional images.

5. The system of claim 4, wherein the synthetic training generator is configured to transform the item of interest by performing at least one of:
  scaling the item of interest in accordance with a scaling factor; or
  rotating the item of interest in accordance with a rotation factor.

6. The system of claim 4, wherein the synthetic training data generator is configured to increase an amount of variance in transforming the item of interest as a classification performance score of the machine learning model is increased.

7. The system of claim 3, further comprising:
  a performance analyzer configured to determine an average classification performance score of the machine learning model, the average classification performance score being based on an average of a plurality of classification performance scores, each of the plurality of classification performance scores being indicative of the classification performance of the machine learning model with respect to a particular item of interest of a plurality of items of interest, wherein the synthetic training data generator is configured:
    select a fourth three-dimensional image comprising another container and not comprising the item of interest with a probability corresponding to the average classification performance score; and
    generate a plurality of second composite three-dimensional images based on the fourth three-dimensional image and the third three-dimensional image.

8. The system of claim 3, further comprising:
  a performance analyzer configured to determine a classification performance score of the machine learning model, and wherein the synthetic training data generator is configured to:
  select the third three-dimensional image with a probability proportional to the classification performance score.

9. A method for detecting an item of interest in a container, comprising:
  receiving a first three-dimensional image depicting a container for storing items;
  segmenting the first three-dimensional image into a plurality of segmented windows;
  sampling a predetermined number of voxels from each of the plurality of segmented windows;
  providing the voxels sampled from each segmented window of the plurality of segmented windows as an input to a machine learning model that is configured to generate classifications for the provided voxels, each classification comprising a probability as to whether a respective voxel comprises at least a portion of the item of interest;
  outputting a final classification as to whether the first three-dimensional image comprises the item of interest based on the generated classifications;
  determining that the final classification meets a threshold condition; and
  responsive to said determining that the final classification meets the threshold condition, generating an alert that indicates that the item of interest has been detected in the container.

10. The method of claim 9, wherein the machine learning model is an artificial neural network-based machine learning model.

11. The method of claim 9, further comprising:
  during each iteration of a training session for the machine learning model:
    selecting a second three-dimensional image comprising the container and not comprising the item of interest;
    selecting a third three-dimensional image comprising the item of interest;
    generating a plurality of composite three-dimensional images based on the second three-dimensional image and the third three-dimensional image, each of the plurality of composite three-dimensional images comprising the item of interest;

for each composite three-dimensional image of the plurality of composite three-dimensional images:
cropping the composite three-dimensional image around the item of interest included in the composite three-dimensional image; and
sampling a plurality of voxels associated with the cropped composite three-dimensional image; and
providing the plurality of voxels sampled from each composite three-dimensional image of the plurality of composite three-dimensional images to the machine learning model as a training data set, the machine learning model being trained to detect the item of interest based on the plurality of voxels sampled from each composite three-dimensional image of the plurality of composite three-dimensional images.

12. The method of claim 11, wherein generating the plurality of composite three-dimensional images comprises:
for each of a plurality of iterations:
transforming the item of interest; and
inserting the transformed item of interest in a location within the container of the second three-dimensional image to generate a composite three-dimensional image of the plurality of composite three-dimensional images.

13. The method of claim 12, wherein transforming the item of interest comprises at least one of:
scaling the item of interest in accordance with a scaling factor; or
rotating the item of interest in accordance with a rotation factor.

14. The method of claim 12, wherein an amount of variance in transforming the item of interest increases as a classification performance score of the machine learning model is increased.

15. The method of claim 11, further comprising:
determining an average classification performance score of the machine learning model, the average classification performance score being based on an average of a plurality of classification performance scores, each of the plurality of classification performance scores being indicative of the classification performance of the machine learning model with respect to a particular item of interest of a plurality of items of interest;
selecting a fourth three-dimensional image comprising another container and not comprising the item of interest with a probability corresponding to the average classification performance score; and
generating a plurality of second composite three-dimensional images based on the fourth three-dimensional image and the third three-dimensional image.

16. The method of claim 11, selecting the third three-dimensional image comprising the item of interest comprises:
determining a classification performance score of the machine learning model; and
selecting the third three-dimensional image with a probability proportional to the classification performance score.

17. A computer-readable storage medium having program instructions recorded thereon that, when executed by at least one processor, perform a method for detecting an item of interest in a container, the method comprising:
receiving a first three-dimensional image depicting a container for storing items;
segmenting the first three-dimensional image into a plurality of segmented windows;
sampling a predetermined number of voxels from each of the plurality of segmented windows;
providing the voxels sampled from each segmented window of the plurality of segmented windows as an input to a machine learning model that is configured to generate classifications for the provided voxels, each classification comprising a probability as to whether a respective voxel comprises at least a portion of the item of interest;
outputting a final classification as to whether the first three-dimensional image comprises the item of interest based on the generated classifications;
determining that the final classification meets a threshold condition; and
responsive to said determining that the final classification meets the threshold condition, generating an alert that indicates that the item of interest has been detected in the container.

18. The computer-readable storage medium of claim 17, wherein the machine learning model is an artificial neural network-based machine learning model.

19. The computer-readable storage medium of claim 17, the method further comprising:
during each iteration of a training session for the machine learning model:
selecting a second three-dimensional image comprising the container and not comprising the item of interest;
selecting a third three-dimensional image comprising the item of interest;
generating a plurality of composite three-dimensional images based on the second three-dimensional image and the third three-dimensional image, each of the plurality of composite three-dimensional images comprising the item of interest;
for each composite three-dimensional image of the plurality of composite three-dimensional images:
cropping the composite three-dimensional image around the item of interest included in the composite three-dimensional image; and
sampling a plurality of voxels associated with the cropped composite three-dimensional image; and
providing the plurality of voxels sampled from each composite three-dimensional image of the plurality of composite three-dimensional images to the machine learning model as a training data set, the machine learning model being trained to detect the item of interest based on the plurality of voxels sampled from each composite three-dimensional image of the plurality of composite three-dimensional images.

20. The computer-readable storage medium of claim 19, wherein generating the plurality of composite three-dimensional images comprises:
for each of a plurality of iterations:
transforming the item of interest; and
inserting the transformed item of interest in a location within the container of the second three-dimensional image to generate a composite three-dimensional image of the plurality of composite three-dimensional images.

* * * * *